Jan. 2, 1940.  T. O. KOSATKA ET AL  2,185,790
DOUBLE WIPE FLUID SEAL
Filed Aug. 7, 1937
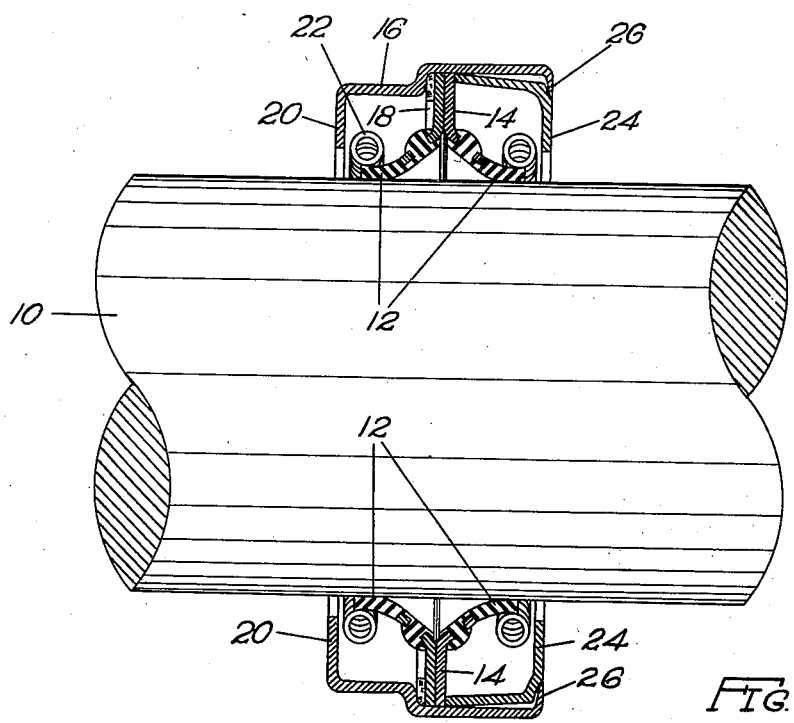
Fig. 1
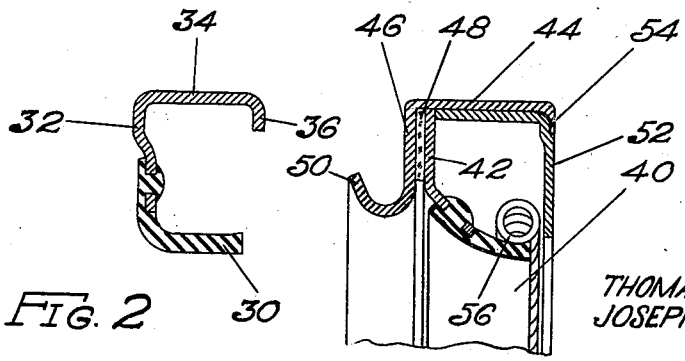
Fig. 2
Fig. 3
THOMAS O. KOSATKA
JOSEPH A. ANTONELLI
INVENTORS
PER
*Albert J. Fihe*
ATTORNEY Patented Jan. 2, 1940

2,185,790

UNITED STATES PATENT OFFICE 2,185,790

DOUBLE WIPE FLUID SEAL

Thomas O. Kosatka, Cicero, and Joseph A. Antonelli, Chicago, Ill., assignors to Victor Manufacturing & Gasket Company, Chicago, Ill., a corporation of Illinois Application August 7, 1937, Serial No. 157,870

2 Claims. (Cl. 288—3)

This invention relates to an improved double wipe fluid seal and has, for one of its principal objects, the provision of an oil seal, grease retainer or other sealing element which can be positioned about a shaft and which will efficiently act to retain lubricants or the like in proper position in the casing in which such shaft is positioned.

One of the important objects of this invention is to provide, in a fluid seal, a simplified form of sealing element which can be made in quantities by a production process, thereby producing a device which is both better and cheaper.

Another important object of the invention is the provision of a sealing element which, in itself, comprises a unitary structure which may or may not, by itself, be introduced into a housing about a shaft so as to form a sealing relationship therewith.

Another and further important object of the invention is to provide, in a fluid seal or the like, the combination of a sealing element or diaphragm, a metallic support therefor, and a metallic housing for the sealing element and its support, which housing shall further include an oil-splashing element or guard.

Other and further important objects of the invention will be apparent from the disclosures in the accompanying drawing and following specification.

The invention, in a preferred form, is illustrated in the drawing and hereinafter more fully described.

In the drawing:

Figure 1 is a sectional view of the improved fluid seal of this invention, showing the same as applied to a shaft and somewhat larger than in the ordinary construction.

Figure 2 is a detail sectional view of the sealing element per se, the metallic support which is integral therewith being in a somewhat different shape than the similar support shown in Figure 1.

Figure 3 is a sectional view of a sealing element constructed in accordance with the principles of this invention, and wherein the casing or housing, instead of including an additional or double sealing element, comprises an oil splasher integral with the casing or housing itself.

As shown in the drawing:

The reference numeral 10 indicates generally a revolvable shaft to which the improved double wipe oil seal of this invention may be applied. This fluid seal comprises essentially a pair of sealing members or diaphragms 12, each preferably composed of some suitable material such as synthetic rubber or the like and which, during the process of manufacture, is actually molded or vulcanized to a metallic washer 14 which forms a support therefor. It will be noted that the washer has its inner annular edge bent as shown and that this inner edge has openings therein through which the material of the sealing diaphragm 12 flows during the process of molding or vulcanizing, whereby an integral unitary device results and wherein the synthetic rubber is so firmly molded or attached to the metal that it is practically impossible for the same to become loose or work off.

These two sealing elements 12 with their metallic supporting washers 14 are then placed back to back as shown and inserted into a housing 16 which is shaped as illustrated in the drawing with an annular side wall having an offset or shoulder against which the metal washers are positioned, and a fluid sealing washer or gasket usually of cork or the like is positioned against this shoulder beneath a face of one washer 14 so as to provide a suitable seal against leakage at this portion of the periphery.

One end 20 of the housing 16 is bent downwardly as shown, first to provide a guard for the sealing element and also to further act to retain in position a garter spring or the like 22 which acts to constrict the outer flange of the sealing element against the shaft 10 in the usual known manner.

Opposed from the face 20 is a cup-shaped element 24 which is also positioned in the housing 16, the inner edge of the cup-shaped element 24 raising against the outer face of the uppermost washer 14 as shown in Figure 1, and in order to maintain this cup-shaped element in position, the outermost flange or edge 26 of the shell or housing 16 is turned or spun downwardly as shown in order to provide a unitary leakproof structure which can be readily installed and is simple, efficient and economical in operation.

As best shown in Figure 2, a modified form of sealing element can be made by molding a diaphragm or the like 30 to a metallic washer 32 which is then bent into shape as shown having an outer periphery 34 and an in-turned edge 36 whereby the same may, as a unit, be conveniently inserted into a housing about a shaft and which will form an adequate seal, particularly for light work.

A further adaptation of the invention is shown in Figure 3 wherein the diaphragm or sealing element 40 is molded to a metal washer or support 42, the same being inclosed in a housing 44 having one face 46 against which a cork washer or gasket 48 is preliminarily positioned, and the inner end of this housing structure is turned upwardly and thence outwardly as best shown at 50 to provide an integral oil splasher.

Into the opposed faces of the housing 44—46 is inserted a cup-shaped element 52 quite similar in construction to the corresponding element 24 of Figure 1, and the edge of the housing is spun downwardly as illustrated at 54 to provide an adeqate sealing relationship between all the parts. The usual garter spring 56 is included in the construction.

It will be evident that herein is provided a sealing element which includes in one embodiment a double wipe structure and which includes in another embodiment, a combination of a diaphragm or wiping seal with an oil splasher, while, in still a third embodiment, the sealing element with its support may be employed per se as a complete seal.

The molding of the synthetic rubber flexible sealing element to metallic washers of standard size and shape allows of quantity production while, at tne same time, assuring of a better and more satisfactory final product.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

1. A fluid seal, comprising an annular housing, an offset shoulder in the housing, and a pair of sealing elements positioned against the shoulder, each of said sealing elements comprising a flexible synthetic rubber diaphragm, a metal washer angular in cross-section supporting the diaphragm, only the washer portions abutting the shoulder, a sealing gasket between the shoulder and one of the supporting washers, means for maintaining the washers in the housing and in fluid-tight relationship against the shoulder, said means comprising a cup-shaped metal element positioned in the housing with its edge abutting the periphery of the outermost diaphragm washer, and an inturned edge on the housing for maintaining said cup-shaped element in position.

2. A fluid seal, comprising an annular housing, an offset shoulder in the periphery of the housing, and a pair of sealing elements positioned against the inner face of the shoulder, each of said sealing elements comprising a flexible diaphragm, a metal washer angular in cross-section supporting the diaphragm, the diaphragm contacting the inner angularly offset periphery of the washer, only the metal portions abutting the shoulder, a sealing gasket between the shoulder and one of the supporting washers, means for maintaining the washers in the housing and in fluid-tight relationship against the shoulder, said means comprising a cup-shaped metal element positioned in the housing with its edge abutting the periphery of the outermost diaphragm supporting washer, and an inturned edge on the housing for maintaining said cup-shaped element and the washers in position, garter springs about the diaphragms, and means for maintaining said garter springs in position.

THOMAS O. KOSATKA.
JOSEPH A. ANTONELLI.